United States Patent [19]

Betts et al.

[11] Patent Number: 4,876,011
[45] Date of Patent: Oct. 24, 1989

[54] OIL RECOVERY APPARATUS

[75] Inventors: Peter Betts, Prior Lake; Darrell D. Jahn, Shakopee, both of

[73] Assignee: Donaldson Company, Inc., Minneapolis, Minn.

[21] Appl. No.: 196,758

[22] Filed: May 17, 1988

Related U.S. Application Data

[63] Continuation of Ser. No. 866,140, May 22, 1986, abandoned.

[51] Int. Cl.⁴ .............................................. C02F 1/40
[52] U.S. Cl. ................................ 210/526; 210/923; 210/924
[58] Field of Search ............... 210/242.4, 400, 502.1, 210/526, 924, 242.3, 923; 198/643; 502/402; 24/446

[56] References Cited

U.S. PATENT DOCUMENTS

| | | |
|---|---|---|
| 831,448 | 9/1906 | Leineber ............................ 198/643 |
| 3,000,384 | 9/1961 | Piers, Jr. . |
| 3,009,235 | 11/1961 | De Mestral . |
| 3,076,244 | 2/1963 | De Mestral . |
| 3,130,111 | 4/1964 | Izumi . |
| 3,147,528 | 9/1964 | Erb . |
| 3,154,837 | 11/1964 | De Mestral . |
| 3,192,589 | 7/1965 | Pearson . |
| 3,270,408 | 9/1966 | Nealis . |
| 3,314,545 | 4/1967 | Grabbe et al. ...................... 210/526 |
| 3,387,345 | 6/1968 | Savoir . |
| 3,508,663 | 4/1970 | Brill ................................... 210/924 |
| 3,613,891 | 10/1971 | Cloutier ............................. 210/526 |
| 3,617,555 | 11/1971 | Ginsburgh et al. ................. 210/400 |
| 3,617,556 | 11/1971 | Cole et al. .......................... 210/242.4 |
| 3,640,394 | 2/1972 | Brill et al. .......................... 210/924 |
| 3,667,608 | 6/1972 | Burroughs et al. ................. 210/242.4 |
| 3,695,451 | 10/1972 | Schmidt, Jr. et al. .............. 210/526 |
| 3,703,238 | 11/1972 | Torpey ............................... 210/526 |
| 4,089,784 | 5/1978 | Ettelt et al. ........................ 210/526 |
| 4,192,747 | 3/1980 | Wykoff .............................. 210/526 |
| 4,316,804 | 2/1982 | Bocard et al. ..................... 210/242.4 |
| 4,366,069 | 12/1982 | Dudrey et al. ..................... 210/776 |
| 4,377,478 | 3/1983 | Rolls et al. ......................... 210/924 |
| 4,421,645 | 12/1983 | Creps et al. ........................ 210/526 |
| 4,575,426 | 3/1986 | Littlejohn et al. ................. 210/924 |
| 4,582,604 | 4/1986 | Bashaw ............................. 210/526 |

FOREIGN PATENT DOCUMENTS

| | | |
|---|---|---|
| 2703210 | 8/1978 | Fed. Rep. of Germany ...... 210/400 |
| 140580 | 8/1982 | Japan ................................. 198/643 |

OTHER PUBLICATIONS

"Scotchmate" Dual Lock Fastening Systems—brochure by 3M Company of St. Paul, Minn.
Velcro ® Product Information Guide-brochure by Velcro USA, Inc., of New York, N.Y., 1976.

Primary Examiner—Richard V. Fisher
Assistant Examiner—Joseph Drodge
Attorney, Agent, or Firm—Merchant, Gould, Smith, Edell, Welter & Schmidt

[57] ABSTRACT

An apparatus for skimming oil from the surface of a liquid is disclosed. The apparatus includes an endless belt which is formed from the loop portion of a loop and hook type fastener. The belt is supported to move in a path of travel with a portion of the belt disposed within the liquid. As the belt travels, oil is captured within the material of the belt. A scraping mechanism is provided for scraping an initial amount of oil off of the belt. Rollers are provided for squeezing out the remaining oil on the belt. Oil which is removed by the scrapers and the rollers is captured in a pan and collected.

12 Claims, 2 Drawing Sheets

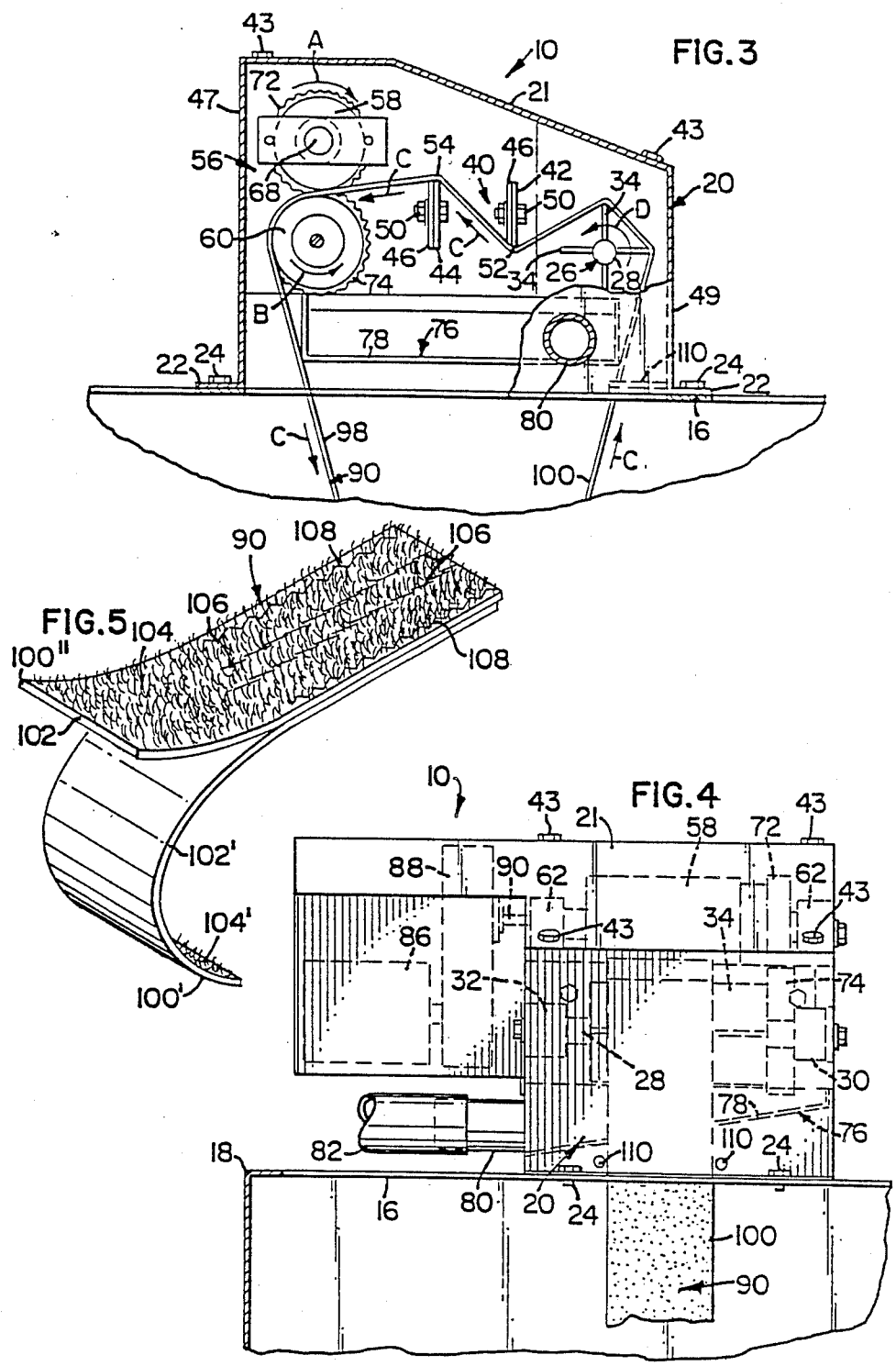

OIL RECOVERY APPARATUS

This is a continuation of U.S. patent application Ser. No. 866,140, filed May 22, 1986, now abandoned.

BACKGROUND OF THE INVENTION

I Field of the Invention

This invention pertains to apparatus for recovering oil which collects on the surface of a liquid. More specifically, this invention pertains to an oil recovery apparatus which includes an endless belt for collecting oil from the surface of the liquid and means for releasing the collected oil from the belt.

II. Description of the Prior Art

In the prior art, numerous apparatus have been developed to skim oil or the like floating on a layer of liquid such as water. An example of such is shown in U.S. Pat. No. 3,640,394 to Brill, et al., dated Feb. 8, 1972. The Brill patent teaches a generally circular rigid loop which is rotated in and and out of a pool of water to attract oil. The oil is squeezed out of the loop by a pair of opposing disks. Another example of an oil skimming apparatus is shown in U.S. Pat. No. 3,314,545 to Grabbe, et al. dated Apr. 18, 1967. In the Grabbe patent, oil is removed from the water surface by passing an endless conveyor belt through the water surface with the belt picking up the oil and advancing to a cleaning station where the oil is removed.

Oil skimming apparatus are commonly found in the machine tool and waste-water industries to separate floating waste oil from fluids. It is desirable to separate the oil in order to recover usable fluids and to avoid environmentally unsatisfactory consequences of discharging fluids mixed with waste oil. The standards by which oil skimming apparatus are judged include the rate at which the apparatus can remove oil from a liquid (measured in volume per unit time), the degree of oil separation (i.e. the absence of the base liquid in the separated oil) and the ease of maintenance. While the prior art provides apparatus for separating oil from water and other liquids, there is an increasing need to develop an oil skimming apparatus which provides for an ever increased oil removal rate while insuring minimum mixture of the oil and the base liquid in the separated oil. The absence of the base liquid in the separated oil is particularly important where it is desirable to reuse the separated oil.

OBJECTS AND SUMMARY OF THE INVENTION

It is an object of the present invention to provide an oil skimmer for skimming oil or the like from the surface of a liquid.

A further object of the present invention is to provide an oil skimming apparatus which generates a separated oil having a reduced amount of base fluid mixed with the separated oil.

A yet further object of the present invention is to provide an oil skimming apparatus with an enhanced oil removal rate and which is easy to maintain.

According to a preferred embodiment of the present invention, an apparatus for skimming oil from the surface of a liquid is provided. The apparatus includes an endless belt of hydrophobic non-absorbant material which is woven to form a plurality of densely packed loops. Means are provided for supporting the belt with a first portion supported above the liquid and a second portion submerged within the liquid. A drive mechanism is provided for moving the belt with the belt having a first run moving from the first portion to the second portion and a second run moving from the second portion to the first portion. As the belt moves, the second run carries captured oil out of the surface of the liquid. Means are provided for separating the captured oil from the second run of the belt and for collecting the separated oil.

BRIEF DESCRIPTION OF THE DRAWINGS

FIG. 3 is a view taken along lines 3—3 of FIG. 2;

FIG. 4 is an end view taken in elevation of the oil skimming apparatus of the present invention; and FIG. 5 is a view of a portion of the endless belt of the oil skimming apparatus of the present invention showing the belt partially separated to highlight its construction.

DESCRIPTION OF THE PREFERRED EMBODIMENT

Figure 1:
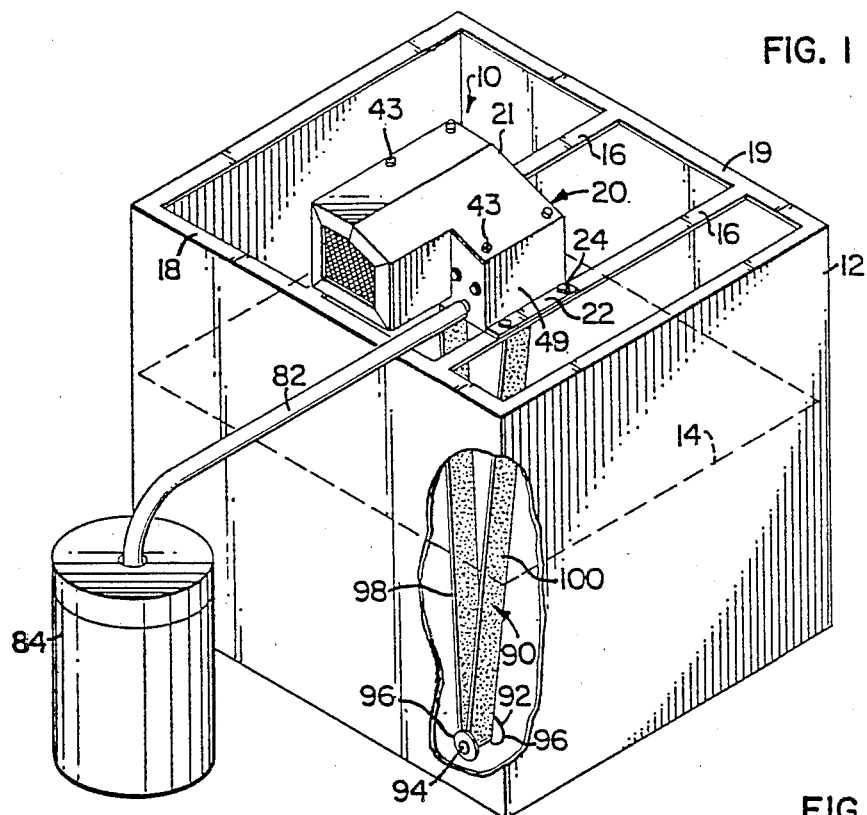
FIG. 1 is a perspective view of an oil skimming apparatus according to the present invention.

Referring now to the drawings, an oil skimming apparatus according to the present invention is generally shown at 10. With particular reference to FIG. 1, the oil skimming apparatus 10 is provided for use with a tank 12 which contains a liquid at a certain level indicated by the dotted line 14. Preferably, the oil skimming apparatus 10 will be used to separate oil from the surface of a body of water. To support the oil skimming apparatus 10, a pair of cross support beams 16 span the top of the tank 12 from a first side wall 18 to a second side wall 19. The oil skimming apparatus 10 includes a housing 20 having flanges 22 which are sized to rest upon support beams 16 and are bolted to the beams 16 by means of bolts 24.

Figure 2:
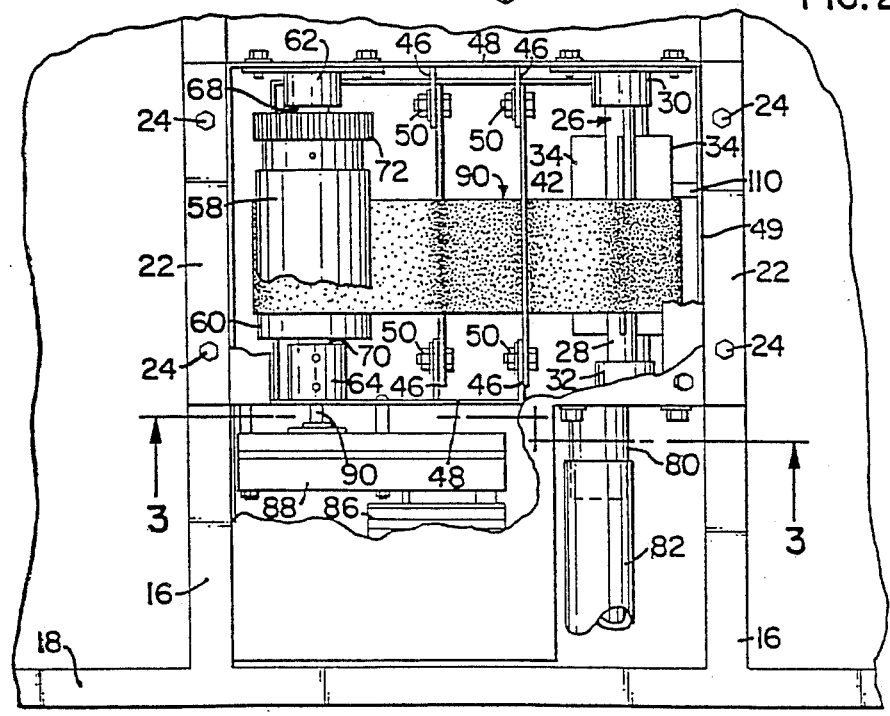
FIG. 2 is a top plan view of the apparatus of FIG. 1 with the cover of the apparatus partially removed to expose the working elements of the oil skimming apparatus.

Referring now to FIGS. 2-4, the oil skimming apparatus 10 includes an idler 26 disposed within the housing 20. A pair of aligned bearing supports 30 and 32 support a shaft 28 of idler 26 for rotation about the shaft axis. Bearings 30 and 32 are aligned such that shaft axis of shaft 28 is horizontal. The idler 26 further includes a plurality of vanes 34 which project radially from the access of shaft 28 and extend parallel to the axis in their longitudinal dimension.

A scraper mehanism 40 is provided disposed within housing 20 and includes a first scraper bar 42 and a generally parallel aligned second scraper bar 44. Scraper bars 42 and 44 are maintained in generally parallel vertical alignment by means of mounting brackets 46 extending from side walls 48 of housing 20. The scraper bars 42 and 44 are secured to the mounting brackets by nut and bolt means 50. Shown best in FIG. 3, the first scraper bar 42 has a first scraping surface 52 facing downwardly. Second scraper bar 44 has a second scraping surface 54 facing upwardly.

Disposed within housing 20 on a side of scraper mechanism 40 opposite idler 26, a drive and cleanse mechanism 56 is provided. Drive and cleanse mechanism 56 includes a pair of rollers including an upper or first roller 58 and a lower or second roller 60. A first pair of bearing mounts 62 is disposed in horizontal alignment on side walls 48 and a second pair of bearing mounts 64 are disposed in horizontal alignment on side walls 48 with second bearing mounts 64 disposed beneath the first bearing mounts 62. First roller 58 has a first extending shaft 68 extending axially through roller 58. Shaft 68 is received journaled within the first pair of bearing mounts 62 for the first roller 58 to be rotatable about a generally horizontal axis. Likewise, second roller 60 has a second extending shaft 70 extending axially therethrough which is received within second bearing mounts 64 for second shaft 70 and second roller 60 to rotate about a generally horizontal axis aligned beneath first shaft 68. First roller 58 and second roller 60 are disposed within housing 20 with the rollers defining a narrow gap in the space between the opposing rollers with the gap located slightly lower than second scraping surface 54.

An oil collecting pan 76 is disposed beneath idler 26, scraping mechanism 40 and drive and cleansing mechanism 56 and has a floor 78 which is inclined downwardly toward an outlet conduit 80. A host 82 connects outlet conduit 80 in liquid flow communication with an oil collecting drum 84 (shown in FIG. 1).

Means are provided for driving the first and second rollers 58, 60 and includes a motor 86 supported within housing 20 through any suitable means (not shown) and operably connected to a gear reduction unit 88, all of which are conventional and well known. A driving shaft 90 extends from gear reduction unit 88 and is axially aligned and connected to upper shaft 68 through any suitable means (not shown). Accordingly, shaft 68 and roller 58 are directly driven by motor 86. Each of first shaft 68 and second shaft 70 are provided with cooperating intermeshed gears 72 and 74 in order for lower roller 60 to rotate in an opposite direction as upper roller 58.

An endless belt 90 is provided and connected to the apparatus 10 by the belt 90 being disposed to travel on top of idler 26. The belt 90 extends beneath first scraper bar 42 and above second scraper bar 44 and extends through the gap defined between opposing surfaces of upper roller 58 and lower roller 60. To submerse a portion of belt 90 between liquid level 14, a weighted submersion pulley 92 is provided as shown in FIG. 1. Submersion pulley 92 includes a shaft 94 sized to extend the width of belt 90 and terminating at a pair of opposing retaining disks 96. Submersion pulley 92 is preferably formed of a heavy material such as steel or the like such that the weight of the pulley 92 retains a portion of belt 90 submersed below water level 14 and keeps the belt 90 in tension against scrapers 42 and 44. With the belt so installed, the belt may conveniently be separated into two portions which may be referred to as a first run 98 extending from rollers 58, 60 to pulley 92 and a second run 100 extending from pulley 92 to rollers 58, 60.

Endless belt 90 is preferably formed from the loop portion of loop and hook type fasteners. Loop and hook type fasteners are commonly available items and examples of such are marketed under the brand name Velcro by Velcro U.S.A., New York, N.Y. and Scotchmate by 3M Company of St. Paul, Minn. Hook and loop type fasteners include a hook material and a loop material. Examples of such fasteners are shown in U.S. Pat. Nos. 3,130,111; 3,154,837; 3,009,235 and 3,387,345. The loop material is generally formed of hydrophobic nonabsorbent material (such as nylon or Dacron) which is woven to form a plurality of densely packed loops which are formed on a substrate layer. The loops cover the surface of the material in the form of a raised pile. I have determined that the loop material of hook and loop type fasteners makes a surprisingly good material for the purpose of skimming oil from the surface of water and that the material in conjunction with the other novel features of the present invention provides for an oil skimming apparatus of enhanced performance. The loop material collects oil in the loop but, due to the non-absorbency of the material, the oil is not wicked or absorbed into the material itself. Also, the material is hydrophobic such that little or no water is carried on the material during the oil separation process.

In FIG. 5, a preferred construction of the endless belt is shown including a first layer of loop material 100" and second layer of loop material 100'. Each of the loop material layers 100", 100' include substrate layers 102, 102' and layers of densely packed woven loops 104, 104'. As shown in FIG. 5, the belt 90 is formed by joining upper layer 100" to lower layer 100' by abutting substrate layer 102 against substrate layer 102' and sewing the two layers together by straight stitching 106 extending generally through the center of the belt 90 and cross stitching 108 along both outer edges of the belt 90. So constructed, during the scraping steps, as will be described, first densely packed loop layer 104 is scraped against surface 52 and second density packed loop layer 104' is scraped against surface 54.

In operation of the apparatus of the present invention, motor 86 directly drives upper roller 58 to rotate in the direction of arrow A. By reason of gears 72, 74, lower roller 60 rotates in the direction of arrow B. With belt 90 squeezed between rollers 58 and 60, the rotation of the rollers urges the belt 90 to move in the direction of the arrows C. Movement of the belt over idler 26 causes idler 26 to rotate in the direction of arrow D.

As the belt 90 passes through liquid layer 14, around pulley 92 back through liquid layer 14 and toward idler 26, the belt 90 passes through a layer of oil on the surface at layer 14. Guide bars 110 mounted on housing back wall 49 insure that belt 90 is properly aligned with idler 26. Idler 26 insures that as belt 90 approaches bar 42, the belt is disposed above first scraper surface 52. As can be seen in FIG. 3, idler 26 only engages belt 90 by reason of the axially extending edges of vanes 34 engaging loop surface 104' in spaced-apart increments. Accordingly, as belt 90 passes over idler 26, idler 26 does not force substantial amounts of oil out of the belt 90. As the belt 90 passes through scraper mechanism 40, first loop surface 104 is scraped against first scraping surface 52 and second loop surface 104' is scraped against second scraping surface 54. The scraping action of the belt against the scraping bars 52 and 54 results in a first step removal of oil from belt 90. Oil which is scraped off of the belt is collected by pan 76. Due to the nature of inclined floor 78, oil collected within pan 76 flows toward outlet conduit 80 and through flexible hose 82 into oil drum 84. As the belt 90 passes from the scraper mechanism 40 to the clearance between rollers 58 and 60, the rollers squeeze the flexible loops into close contact with their substrates. By this squeezing action, the oil picked up by the belt 90 is almost completely removed from the belt 90 before it returns on its first run 98. Oil which is squeezed out of the belt by the rollers 58,60 slides off the surface of the rollers into pan 76 where it is collected and passed to drum 84. Preferably, rollers 58 and 60 are formed of polyurethane which has a slick non-oil absorbing surface off which the oil readily flows.

As shown in the drawings, the housing 20 includes a roof member 21 secured to the side walls 48 and end walls 47, 49 by means of bolts 43. Through removal of bolts 43, roof 21 can be removed exposing the various mechanical apparatus. As a result, maintenance of the apparatus, such as removal and cleansing of blades 42 and 44 is readily attainable.

From the foregoing detailed description of the present invention, it has been shown how the objects of the present invention have been attained in a preferred manner. However, modifications and equivalents of the disclosed concepts, such as readily occurred to those skilled in the art, are intended to be included in the scope of the invention. Thus, the scope of the invention is intended to be limited only by the scope of the claims such as are or may hereafter be appended hereto.

What is claimed is:

1. An apparatus for skimming oil from the surface of a liquid, said apparatus comprising:
    an endless belt of hydrophobic non-absorbent material formed from a plurality of densely packed loops from the loop portion of a hook and loop type fastener;
    support means for supporting a first portion of said belt above said liquid;
    submersion means for submersing a second portion of said belt within said liquid;
    drive means for urging said belt to travel about said support means and said submersion means with said support means and said submersion means dividing said belt into two runs including a first run moving from said support means to said submersion means and a second run moving from said submersion means to said support means with said oil captured on said second run;
    means for separating said captured oil from said second run above said liquid; and
    means for collecting said separated oil.

2. An apparatus according to claim 1 further comprising an idler disposed to retain said second run above said liquid layer at a first elevation; and
    scraper means disposed on a side of said idler adjacent said first run for scraping oil from said belt.

3. An apparatus according to claim 2 wherein said scraper means includes a first scraper bar having a first scraping surface disposed beneath said first elevation and facing downwardly and a second scraper bar with a second scraping surface facing upwardly and disposed above said first scraping surface with said belt disposed to travel from said first elevation beneath said first scraping surface and above said second scraping surface.

4. An apparatus according to claim 1 wherein said support means includes an idler having a rotary shaft disposed for rotation about a generally horizontal axis and having a plurality of radially projecting axially extending vanes with said belt disposed above said idler.

5. An apparatus according to claim 1 further comprising a pair of rollers disposed in close parallel alignment with said second run disposed to pass between said rollers and said rollers spaced apart a distance to compress said belt material as said belt passes between said roller.

6. An apparatus according to claim 5 wherein said drive means includes a motor operably connected to at least one of said rollers to rotate said roller and urge said belt to travel.

7. An apparatus for skimming oil floating on the surface of a liquid, said apparatus comprising:
    an endless belt of hydrophobic non-absorbent material formed from a plurality of densely packed loops from the loop portion of a hook and loop type fastener;
    an idler disposed above said liquid;
    a pair of rollers disposed above said liquid in close parallel alignment;
    a submersed pulley disposed within said liquid;
    said belt disposed to extend over said idler, between said rollers and beneath said submersed pulley;
    means for urging said belt to travel from said idler to said rollers beneath said submersed pulley and back to said idler with said material capturing oil and retaining said captured oil as said belt moves from said liquid surface around said idler;
    said rollers formed of non-absorbent material and spaced closely together to compress said material as said belt passes between said rollers to release said captured oil; and
    means for collecting said captured oil released by said rollers.

8. An apparatus according to claim 7 further comprising scraper means disposed against said belt between said rollers and idler including a first scraper bar with a first scraping surface and a second scraper bar with a second scraping surface with said belt disposed to pass between said bars with opposition surfaces of said belt alternately scraped by said first and second scraping surfaces.

9. An apparatus according to claim 7 wherein said rollers are formed of polyurethane.

10. An apparatus for skimming oil from the surface of a liquid, said apparatus comprising:
    an endless belt of hydrophobic non-absorbent material formed from a plurality of densely packed loops from the loop portion of a hook and loop type fastener;
    an idler disposed above said liquid;
    a pair of rollers disposed above said liquid in close parallel alignment;
    a submersed pulley disposed within said liquid;
    first and second scraper bars having first and second scraping surfaces disposed between said idler and said rollers;
    said belt disposed to extend over said idler and pass said scraper bars with opposite sides of said belt engaging said first and second scraping surfaces, respectively with said belt extending from said scraper bars to between said rollers and beneath said submersed pulley;
    means for urging said belt to travel from said idler past said scraper bars, through said rollers and beneath said submersed pulley and back to said idler with said material capturing oil and retaining said captured oil as said belt moves from said liquid surface around said idlers;
    said scraper bars and idler disposed for said surfaces of said belt to scape against said scraping surfaces with said scraping surfaces removing an initial amount of oil from said belt and said rollers formed of non-absorbent material and spaced closely together to compress said material as said belt passes between said rollers to release captured oil not scraped by said scrapers; and
    means for collecting oil released by said scrapers and said rollers.

11. An apparatus according to claim 10 wherein said rollers are formed of polyurethane.

12. An apparatus according to claim 10 wherein said endless belt is formed of a hydrophobic non-absorbent material woven to form the plurality of densely packed loops.

* * * * *